United States Patent
You

(10) Patent No.: US 9,021,466 B2
(45) Date of Patent: Apr. 28, 2015

(54) ELECTRONIC DEVICE WITH PROMPTING FUNCTION AND PROMPTING METHOD

(75) Inventor: Qiang You, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 622 days.

(21) Appl. No.: 13/300,643

(22) Filed: Nov. 20, 2011

(65) Prior Publication Data
US 2013/0024853 A1    Jan. 24, 2013

(30) Foreign Application Priority Data

Jul. 21, 2011   (CN) .......................... 2011 1 0205056

(51) Int. Cl.
*G06F 9/445*   (2006.01)
*G06F 9/44*    (2006.01)

(52) U.S. Cl.
CPC ................ *G06F 9/4446* (2013.01); *G06F 8/60* (2013.01)

(58) Field of Classification Search
None
See application file for complete search history.

(56) References Cited

U.S. PATENT DOCUMENTS

2008/0235680 A1*   9/2008   Strauss et al. ................. 717/178

* cited by examiner

*Primary Examiner* — Qamrun Nahar
(74) *Attorney, Agent, or Firm* — Novak Druce Connolly Bove + Quigg LLP

(57) ABSTRACT

An electronic device with a prompting function is provided. The electronic device includes a storage module, a detecting module, a processing module, and a display module. The storage module stores contents associated with dialog boxes which are to be generated during using or installing applications and associated options of each of the contents, the associated options of each of the contents comprising preferred options and not preferred options. The detecting module obtains a content and the associated options of the content from a pop-up dialog box. The processing module compares the obtained content with the stored contents and determines a preferred option of the obtained content according to the stored associated preferred option if the obtained content matches one of the stored content. The processing module further changes the display state of the determined preferred option of the content.

10 Claims, 4 Drawing Sheets

Would you like to uninstall the old version of the application?

Yes  No

FIG. 2

ELECTRONIC DEVICE WITH PROMPTING FUNCTION AND PROMPTING METHOD

BACKGROUND

1. Technical Field

The present disclosure relates to electronic devices with prompting function, and particularly, to an electronic device capable of suggesting a user to select preferred options in a dialog box when using or installing an application, and a method for such a function.

2. Description of Related Art

When using or installing an application, a dialog box with a number of options may pop out for users to select. Generally, the application may has preselected options in the dialog box, but sometimes, some users may neglect the preselected options, and directly continue to the next step, thus results in unwanted options being selected.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding parts throughout the several views.

FIG. 2 is a schematic view of a dialog box with prompt-option in accordance with an exemplary embodiment.

DETAILED DESCRIPTION

Embodiments of the present disclosure will now be described in detail, with reference to the accompanying drawings.

Figure 1:
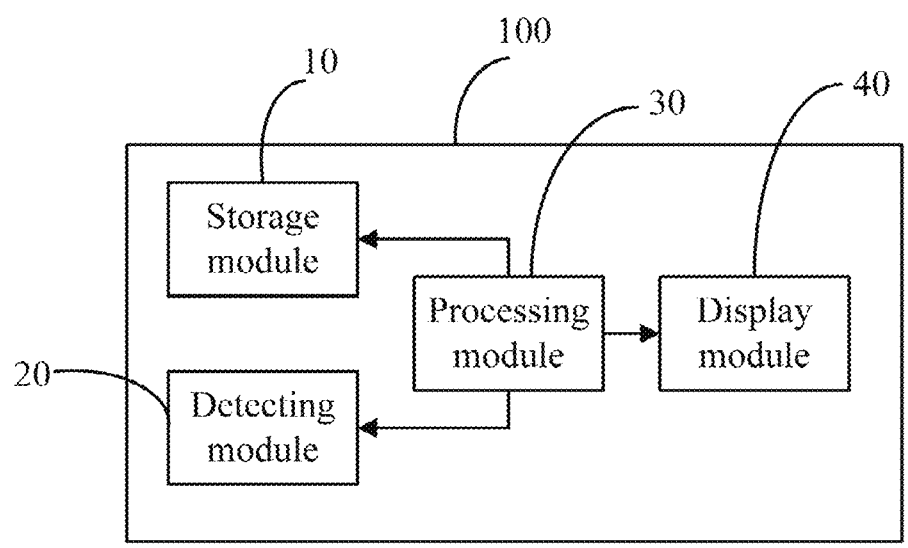
FIG. 1 is a block diagram of an electronic device with a prompting function in accordance with an exemplary embodiment.

Referring to FIGS. 1-2, an electronic device 100 includes a storage module 10, a detection module 20, a processing module 30, and a display module 40. The electronic device 100 is capable of suggesting preferred options associated with dialog boxes to users when using or installing an application.

In an exemplary embodiment, during the installation of the application to the electronic device 100, a series of dialog boxes included in the application are displayed to prompt user to install the application. Each dialog box includes contents and associated options of each of the contents. User can select the options of each of contents to determine the installed process/content of the application.

The storage module 10 stores contents associated with dialog boxes which are commonly generated during use or installation of applications and associated options of each of the contents. The associated options of each of the contents include preferred options and not preferred options. The preferred options are the options commonly selected by the user, and the not preferred options are the options commonly not selected by the user. The storage module 10 further stores a prompt message for each of the not preferred options and associated options of the prompt message. The prompt message of the not preferred options and the associated options are played when the not preferred option is selected. For example, a content asks "Would like to uninstall the old version of the application?", corresponds to a preferred option "yes" and an not preferred option "no", the not preferred option "no" further corresponds a prompt message "a new version of this application cannot be installed, do you want to continue?" and the prompt message further corresponds to options "yes" and "no".

The detecting module 20 is configured to obtain contents and the associated options of the contents from each of the dialog box displayed by the display module 40 during use or installation of the application, using an existing text recognition technology.

The processing module 30 compares the obtained content with the contents stored in the storage module 10 to determine whether the obtained content matches a stored content. If the obtained content matches the stored content, the processing module 30 determines a preferred option in the associated options of the obtained content matches with the stored associated preferred option of the matched stored content, and changes the display state of the determined preferred option of the obtained content displayed in the dialog box to prompt the user this option is the preferred option. For example, as shown in FIG. 2, the color of the suggested option changes to prompt the user. If the obtained content matches none of the stored contents, the processing module 30 generates a message to prompt the user to select a preferred option manually. In this embodiment, the processing module 30 further stores the content which options are manually selected by the user to the storage module 10, and stores the associated option which is selected by the user as the preferred option of the content, and the option which is not selected by the user as the not preferred option. In this embodiment, if the processing module 30 determines a dialog box includes more than one content, the processing module 30 compares the obtained contents with the stored common contents in turn.

In this embodiment, the processing module 30 further determines whether the language of the obtained content is the same as that of the stored content before determining whether a matched content exists in the storage module 10. If the languages of the obtained content and the stored content are the same, the processing module 30 compares the content directly. If the languages are different, the processing module 30 translates the language of the obtained content into the language of the stored contents. For example, if the language of the stored contents is English, and the language of the obtained content is Chinese, the processing module 30 translates the language of the obtained content to English and then compares the translated content with the stored content.

In this embodiment, the processing module 30 further determines whether the user selects the preferred option whose display state has changed. If the user selects the preferred option, the processing module 30 executes the function corresponding to the selected option. If the user selects a not preferred option, the processing module 30 obtains the associated prompt message of the not preferred option and the associated options of the prompt message from the storage module 10 and controls the display module 40 to display the prompt message and the associated options of the prompt message to prompt the user whether to continue the not preferred function. If the processing module 30 determines the user selects to continue the not preferred option, the processing module 30 execute the function corresponding to the selected not preferred option, and if the processing module 30 determines the user selects not to continue the not preferred option, the processing module 30 allows the user to reselect.

Figure 3A:
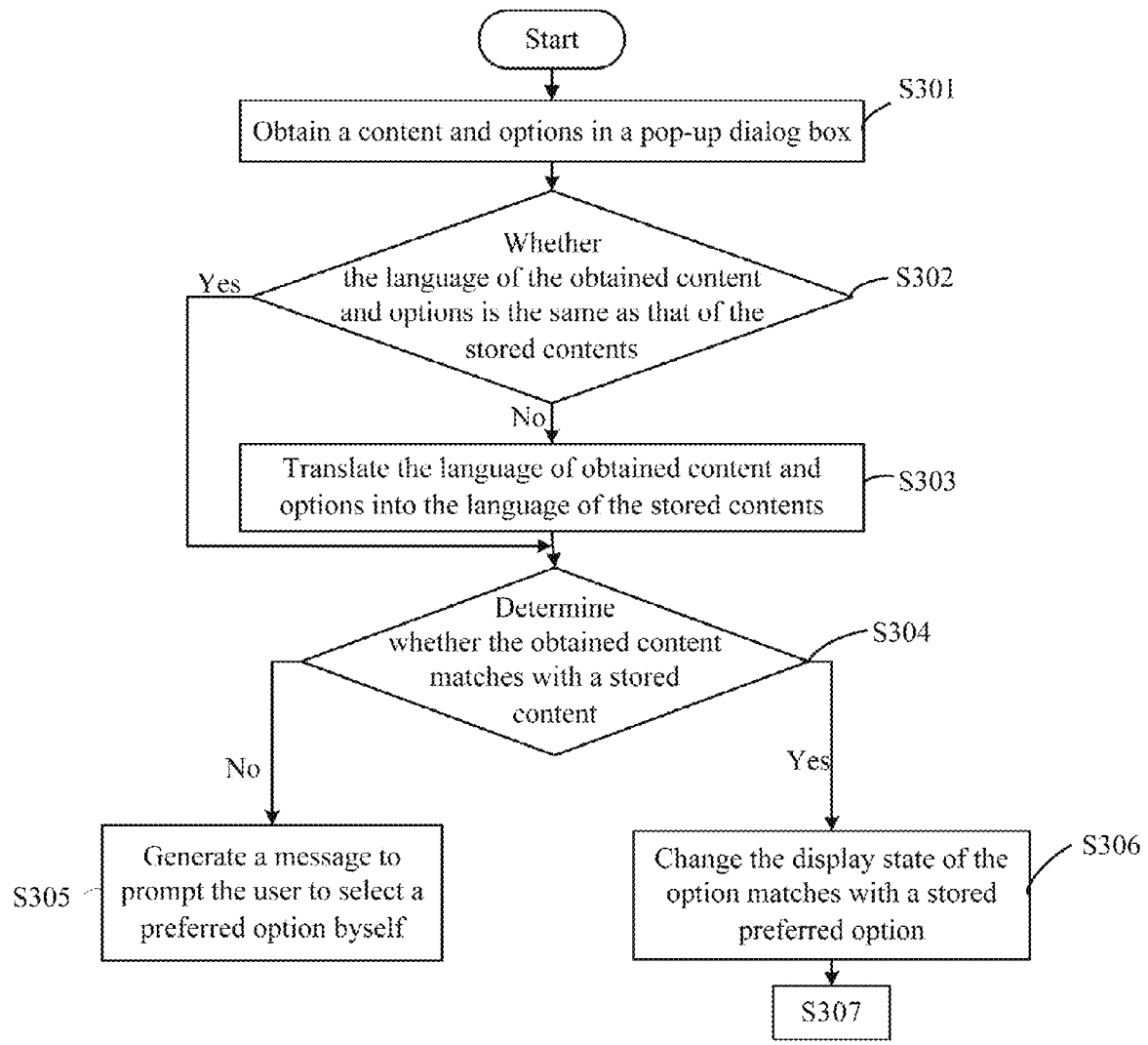
FIGS. 3A-3B are flowcharts of a prompt method in accordance with an exemplary embodiment.
Figure 3B:
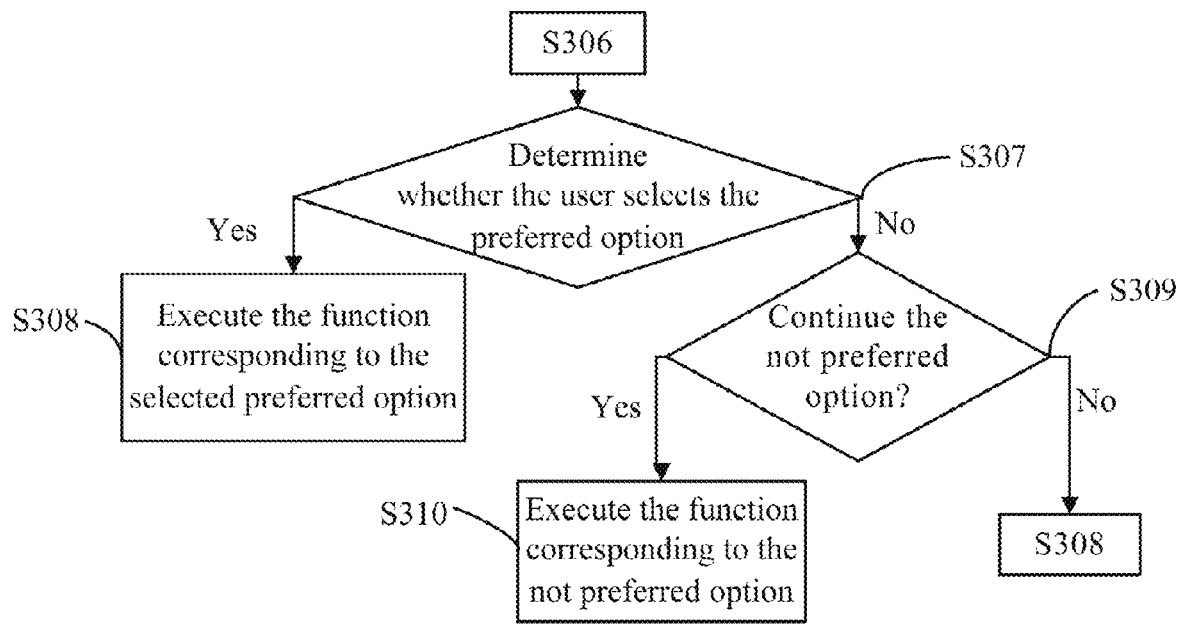

FIGS. 3A-3B show a prompt method in accordance with an exemplary embodiment.

In step S301, the detecting module 20 obtains a content and associated options of the content from a pop-up dialog box displayed by the display module 40 when using or installing an application using an existing text recognition technology.

In step S302, the processing module 30 detects whether the language of the obtained content and options is the same as that of the stored contents, if no, the procedure goes to step S303, if yes, the procedure goes to step S304.

In step S303, the processing module 30 translates the obtained the language of the obtained content and options into the language of the stored contents.

In step S304, the processing module 30 compares the obtained content with the stored contents to determine whether the obtained content matches one of the stored contents, if no, the procedure goes to step S305, otherwise, the procedure goes to step S306. In this embodiment, if a dialog box includes more than one type of content, the processing module 30 compares the obtained contents with the stored contents in turn.

In step S305, the processing module 30 generates a message to prompt the user to select a preferred option manually.

In step S306, the processing module 30 determines a preferred option in the associated options of the obtained content matches the stored associated preferred option of the matched stored content, and changes the display state of the determined preferred option of the obtained content displayed in the dialog box to prompt the user that this option is the preferred option.

In step S307, the processing module 30 determines whether the user selects the determined preferred option of the obtained content whose display state is changed, if yes, the procedure goes to step S308, otherwise, the procedure goes to step S309.

In step S308, the processing module 30 executes the function corresponding to the determined preferred option.

In step S309, the processing module 30 obtains and controls to display the stored associated prompt message of the not preferred option and the associated options of the prompt message to prompt the user whether to continue the not preferred function, if the processing module 30 determines the user selects to continue, the procedure goes to step S310, if processing module determines the user selects not to continue, the procedure back to the step S308.

In step S310, the processing module 30 executes the function corresponding to the selected not preferred option.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device with a prompting function, comprising:
    a memory, wherein the memory stores contents associated with dialog boxes which are to be generated during using or installing applications and associated options of each of the contents, the associated options of each of the contents comprising preferred options and not preferred options;
    a detector to obtain a content and the associated options of the obtained content from a pop-up dialog box generated during using or installing an application;
    a processor configured to determine whether a language of the content and the options obtained by the detector is the same as the language of the contents stored in the memory; wherein if the processor determines that the language of the obtained content and the options is different from that of the stored contents, the processor translates the language of the obtained content and the options into the language of the stored contents; when the language of the obtained content is the same as that of the stored contents, the processor further compares the obtained content with the stored contents to determine whether the obtained content matches one of the stored contents, wherein if the obtained content matches one of the stored contents, the processor further determines a preferred option in the associated options of the obtained content matches with the stored associated preferred option, and change the display state of the determined preferred option of the obtained content displayed in the pop-up dialog box; and
    a displayer, wherein the displayer displays the pop-up dialog box with the content and the options.

2. The electronic device as described in claim 1, wherein if the processor determines the obtained content matches none of the stored contents, the processor generates a message to prompt the user to select a preferred option.

3. The electronic device as described in claim 2, wherein the processor further stores a content with associated options selected by the user to the memory, and stores an associated option which is selected by the user as the preferred option of the content, and stores an associated option which is not selected by the user as the not preferred option.

4. The electronic device as described in claim 1, wherein the memory further stores a prompt message for each of the not preferred options and associated options of the prompt message.

5. The electronic device as described in claim 4, wherein the processor further determines whether the user selects the determined preferred option whose display state is changed, if the user selects an not preferred option, the processor obtains the associated prompt message of the not preferred option and the associated options of the prompt message from the memory and controls the displayer to display the stored prompt message to prompt the user whether to continue the not preferred option, if the processor determines the user selects to continue, the processor executes the function corresponding to the selected not preferred option, and if the processor determines the user selects not to continue, the processor allows the user to reselect.

6. The electronic device as described in claim 1, wherein if the processor determines that the pop-up dialog box comprises more than one content, the processor compares the obtained contents with the stored contents in turn.

7. A prompt method applied in an electronic device, wherein the electronic device comprises a memory storing contents associated with dialog boxes which are to be generated during using or installing applications and associated options of each of the contents, the associated options of each of the contents comprising a preferred option and an not preferred option, the method comprising:
    obtaining a content and associated options of the content from a pop-up dialog box when using or installing an application;
    determining whether a language of the obtained content is the same as that of the stored contents;
    translating the obtained content and the associated options of the obtained content to the language the same as that of the stored content if determining that the languages are different;
    comparing the obtained content with the stored contents to determine whether the obtained content matches with one of the stored contents if the languages are the same; and determining a preferred option in the associated options of the obtained content matches the stored associated preferred option, and changing the display state of the determined preferred option in the associated options of the obtained content if the obtained content matches with one of the stored content.

8. The prompt method as described in claim 7, further comprising:
generating a message to prompt the user to select a preferred option by himself/herself if the obtained content matches none of the stored content.

9. The prompt method as described in claim 7, wherein the memory further stores a prompt message for each of the not preferred option and associated options of the prompt message, the method further comprising:
detecting whether the user selects the determined preferred option whose display state is changed;
executing the function corresponding to the determined preferred option if the user selects the determined preferred option;
obtaining and displaying the stored associated prompt message of the not preferred option to prompt the user whether to continue the not preferred option; and
executing the function corresponding to the not preferred option if the user determines to continue the not preferred option; and allowing the user to reselect if the user determines not to continue the not preferred option.

10. The prompt method as described in claim 7, wherein if the number of the obtained content in one pop-up dialog box is more than one, comparing the obtained contents with the stored contents in turn.

* * * * *